May 5, 1970 R. E. CHAPPELL 3,510,593

TELEPHONE ALARM DEVICE

Filed April 17, 1967 2 Sheets-Sheet 1

INVENTOR.
ROBERT E. CHAPPELL

BY

Mc Cormick, Paulding & Huber

ATTORNEYS.

United States Patent Office 3,510,593

Patented May 5, 1970

3,510,593

TELEPHONE ALARM DEVICE

Robert E. Chappell, Essex Road, Westbrook, Conn. 06498

Filed Apr. 17, 1967, Ser. No. 635,296

Int. Cl. H04m *11/04*

U.S. Cl. 179—5 8 Claims

ABSTRACT OF THE DISCLOSURE

A device for activating a card dialable telephone in response to an alarm signal and including a base for receiving the telephone. A shaft rotatably supported in the base carries cams for raising the telephone receiver and for activating the telephone circuitry when driven by a motor which is energized in response to a signal from the alarm system. A mechanical sound producing device is also carried by the shaft adjacent the telephone receiver so that after a predetermined telephone number is dialed, a coded message is transmitted to such telephone number. One of the cams operates two pushrods, which are mechanically connected to levers for depressing the telephone start bar and for recycling the telephone circuitry by depressing the perforated card to initiate successive cycles of operation as long as the alarm system continues to generate an alarm signal.

SUMMARY OF INVENTION

This invention relates to a device for activating a telephone in response to an alarm signal from a conventional burglar alarm or the like, and deals more particularly with a device for use with a card dialable telephone having a start switch which is closed by novel means, said telephone having a receiver which is raised by said novel means so that a predetermined number can be dialed and a coded message transmitted in response to such alarm signal.

A general object of the present invention is to provide a device for activating a card dialable telephone in response to an alarm signal so that a predetermined telephone number can be dialed, and a coded message transmitted in response to an alarm signal from a conventional burglar alarm or the like.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Detailed description

Figure 2:
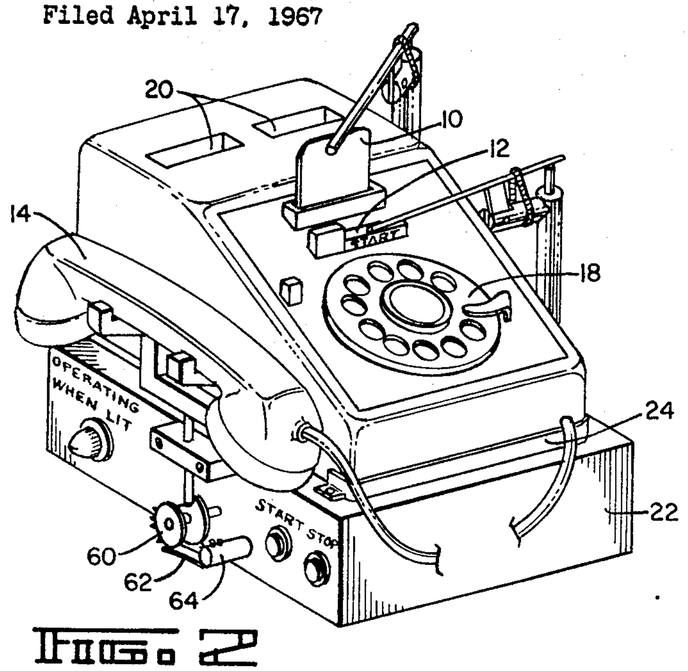
FIG. 2 is a perspective view showing the opposite side of the device of FIG. 1.
Figure 1:
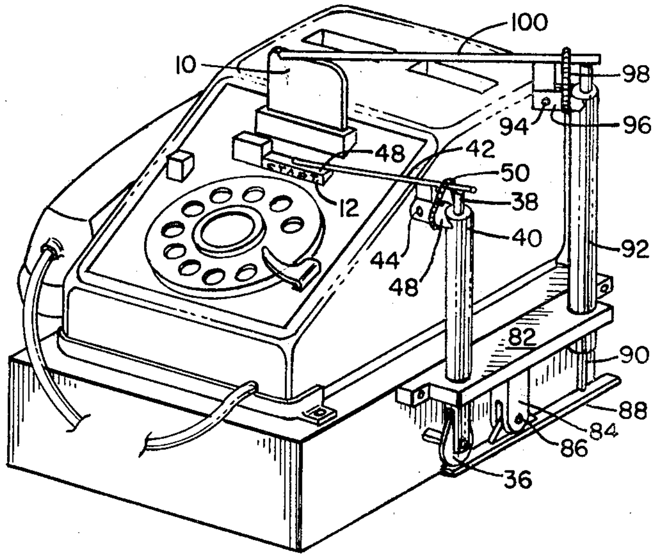
FIG. 1 is a perspective view of a card dialable telephone mounted on a device of the present invention.

Turning now to the drawings in greater detail, FIGS. 1 and 2 show a conventional telephone of the type which can be "dialed" by placing a perforated card 10 in an upwardly open slot in the telephone. A conventional start bar, or switch 12, is provided for activating the conventional telephone circuitry. A conventional receiver 14 is supported on a cradle 16 at one side of the telephone and lifting the receiver 14 from the cradle 16 is also necessary in order to activate the telephone circuitry by closing the switch 12 as mentioned above. The telephone also has a conventional dial 18 which may be used to dial numbers for which cards are not available, and the telephone also includes receptacles 20, 20 in which cards, of the type shown at 10, are adapted to be stored for numbers frequently dialed.

Figure 3:
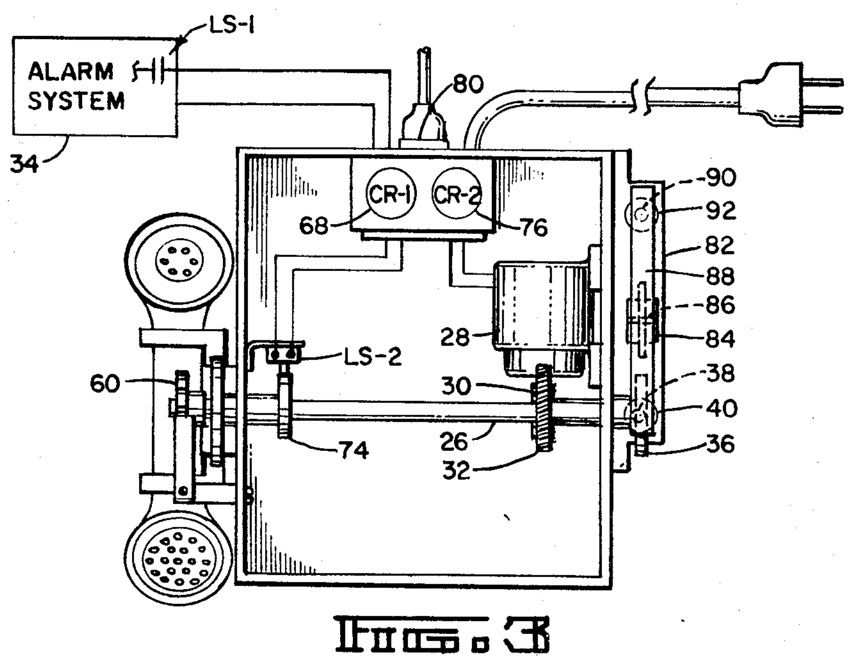
FIG. 3 is a bottom view of the device shown in FIGS. 1 and 2.

In accordance with the present invention, a generally rectangular base is provided beneath the telephone, as shown at 22, and a locating or guide surface 24 is provided thereon for accurately positioning the telephone upon the base 22. A shaft 26 is rotatably supported in the base 22 as best shown in FIG. 3 and a motor 28 is provided for driving the shaft 26 through a predetermined angular displacement at some relatively low speed, as for example, one revolution per minute. Suitable gear reducing means is preferably provided for achieving this low speed and as shown in FIG. 3 a worm gear 30 on the motor shaft meshes with a spur gear 32 mounted on the shaft 26 for this purpose. The shaft 26 carries cam means for lifting the cradle 16, and for depressing the start bar 12 in response to an alarm signal from a conventional burglar alarm system or the like.

More particularly, a first cam 36 is carried at one end portion of the shaft 26, which end portion projects through the side of the base 22 as shown in FIG. 1. A push rod 38 is slidably received in a fixed tube 40 mounted at the right-hand side of the base 22 and the lower end of the rod 38 engages the cam 36 as shown. A generally horizontally disposed lever 42 is pivotally supported on a fixed pivot pin 44 mounted to the tube 40 on an arm 46 and the right-hand end of the lever engages the upper end of the rod 38 as shown. The left hand, or free end portion, of the lever 42 is adapted to engage the start bar 12 in response to upward movement of the push rod 38 as the cam 36 is rotated. Biasing means is provided for urging the right-hand end of the lever 42 into engagement with the upper end of the vertical push rod 38, and as shown said biasing means comprises a resilient elastic band 50 arranged between the arm 48 and the lever 42 as shown. As so constructed, when the motor 28 is energized, the start bar 12 is depressed by the mechanism just described.

In further accordance with the present invention, a second cam 48 is provided on the opposite projecting end portion of the shaft 26 for engagement with the lower end of a second push rod 52 slidably received in a second fixed tube 54 at the opposite or left-hand side of the base 22 as best shown in FIG. 2. The upper end of the rod 52 engages the cradle 16. It will thus be seen that rotation of the shaft 26 causes the cradle 16 to be lifted substantially simultaneously with depression of the start bar 12. Thus whenever the motor 28 is energized, the telephone circuitry is energized and the telephone number selected is dialed. Any sound reaching the telephone receiver 14 will be transmitted to the number called if the circuit is completed by someone answering the call.

A sound producing device is provided adjacent the telephone receiver 14 and is operable in response to rotation of the shaft 26 so that a coded message can be transmitted to the telephone number selected. Preferably, and as shown in FIG. 2, the sound producing device comprises a wheel 60 carried by the shaft 26 and having teeth which are engageable with the free end portion of a resilient metal strip 62 mounted at the side of the base 22 by suitable means indicated generally at 64. Depending upon the configuration of the teeth on the wheel 60 a clicking sound can be produced upon rotation of the shaft 26 to apprise the person listening at the receiving telephone station of the identity, and hence location of the sending telephone.

Figure 4:
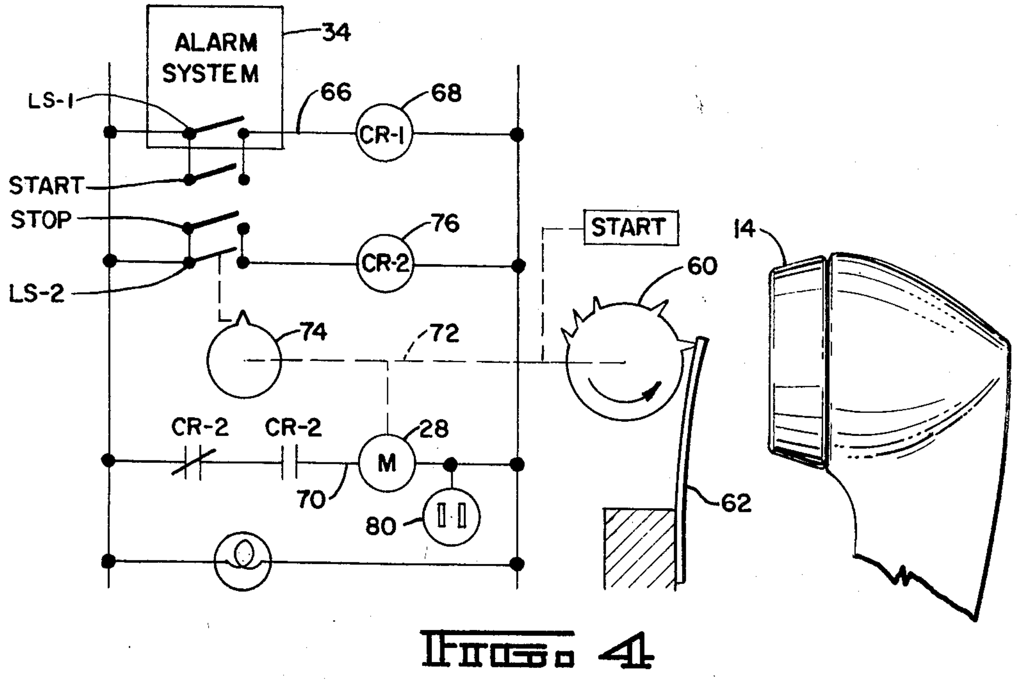
FIG. 4 is a schematic view of the circuitry associated with the device of the present invention, with certain mechanical portions being illustrated in schematic form.

FIG. 4 shows in schematic form one possible electrical circuit for accomplishing rotation of the motor 28 in response to an alarm signal from an alarm system 34. As shown, the alarm signal may comprise an electric current in the line 66 caused by closing of the switch LS–1. A control relay CR–1 (68) will be energized upon closing of the switch LS–1. Contacts CR–1 in the relay 68 are closed so as to energize the motor 28 as indicated by the line 70. As indicated by the broken line 72, rotation of the motor 28 causes rotation of the toothed wheel 60 creating the sound which is picked up by the receiver 14 for transmission to the telephone receiving station mentioned above. It will also be seen from FIG. 4 that a third cam 74 also rotates on the shaft 26 and is mechanically connected to a second switch LS–2, which is closed after one revolution of said shaft. A second control relay CR–2 (76) is energized when the switch LS–2 is closed, opening the normally closed contacts CR–2 and stopping the motor 28 by interrupting the current in the line 70. It is noted that limit switch LS–2 is of the momentary contact type, and hence the device can be seen to de-energize itself after one complete cycle of operation.

In further accordance with the present invention, means is provided for recycling the telephone's internal circuitry as long as the alarm system continues to generate an alarm signal. Since the above described device requires that the station called be somewhat prompt in picking up the telephone receiver to hear the coded clicking sound of the toothed wheel 60, it will be apparent that any undue delay in answering the telephone at the receiving station might result in failure to receive the coded audio signal. The same dilemma would be presented in the event that the receiving station telephone was in use when the alarm device was activated. Therefore, means for recycling the device is shown in the drawing and will now be described in detail.

FIG. 1 showns a support bracket 82 mounted to the right hand side of the base 22 for supporting the tube 40 in which the push rod 38 is slidably received. The push rod 38 operates the lever 42 for initially tripping the start bar 12. After the single cycle of operation described hereinabove, the card 10 is raised to its inactive position by an internal spring return mechanism inside the conventional telephone. The means for recycling the card 10 comprises a depending arm 84 on the bracket 82, which arm 84 pivotally supports a lever 88 for movement about a fixed pivot axis 86. The forward end of the lever 88 engages the cam 36 so that shortly after push rod 38 has been raised to depress the start bar 12, the forward end of lever 88 is depressed raising its rearward end. A push rod 90 is thereby raised in its tube 92, which tube is supported at its lower end on the bracket 82 in the same manner as the tube 40. The upper end of tube 92 carries an arm 96 similar to the arm 48 and a lever 100 is pivotally supported on a fixed pivot pin 94 mounted on the arm 96. The right hand end of the lever 100 is engaged by the upper end of the rod 90 while the left hand, or free end portion, of the lever 100 is adapted to engage the raised card 10 to depress the card in response to upward movement of the push rod 90. Biasing means is provided for urging the right hand end of the lever 100 into engagement with the upper end of the push rod 90, and as shown said biasing means comprises a resilient elastic band 98 arranged between the arm 96 and the lever 100. As so constructed, the card 10 is recycled during each cycle of operation of the device so that the preselected number is successively called and the coded audio signal is successively transmitted as long as the switch LS–1 remains closed.

Finally, start and stop press-to-test switches are provided in parallel with the switches LS–1 and LS–2 respectively for checking the operation of the device, and a power-on warning light 78 is provided to indicate if power is available to the device. A socket 80 is provided in series with the motor 28 in order to permit use of a tape recorder with suitably coded information in lieu of the toothed wheel 60 described hereinabove. While the number on the card 10 will usually be the local police station, some other facility might be used if a large number of devices were installed in a large city where the police station would be unable or unwilling to cope with the variety of calls likely to be received from such devices. In the latter case, some clearing agency could interpret the taped messages for the police in return for some small service charge. For example the telephone company itself might undertake this function at some slight increase in the user's monthly telephone bill.

I claim:

1. A device for linking an alarm system to a card dialable telephone having a start switch and having a receiver positioned on a movable cradle which is adapted to activate the internal telephone circuitry when not held in its inactive position by the weight of the receiver, said device comprising a base upon which the telephone can be placed, a shaft rotatably supported in the base with opposite end portions extending outwardly beyond the sides of the telephone, an electric motor for rotating the shaft, first cam means carried by one shaft end portion, a lever pivotally supported adjacent one side of the telephone so that a free end portion thereof is engageable with said telephone start switch, means connecting said lever to said first cam means for moving said free end portion into engagement with said start switch when said shaft reaches a particular angular position, second cam means carried by the opposite end portion of said shaft, means connecting said second cam means to said receiver cradle for activating said telephone circuitry when said shaft reaches said particular angular position, and circuit means for energizing said motor in response to an alarm signal from said alarm system.

2. The combination according to claim 1 and further characterized by a mechanical sound producing device adjacent said telephone receiver, said device comprising a toothed disc carried by said shaft and a resilient metal strip mounted to said base and having a free end for engaging the teeth on said disc to produce a coded clicking sound during rotation of said shaft.

3. The combination according to claim 1 wherein said circuit means includes means for de-energizing said electric motor after a predetermined angular displacement of said shaft.

4. The combination according to claim 3 wherein said means for de-energizing said electric motor comprises a third cam means on said shaft, and a switch engageable with said third cam means for interrupting current flow to said motor after approximately one revolution of said shaft, so that said shaft is automatically returned to its starting position where it is ready for a repeat cycle upon receiving another alarm signal.

5. The combination according to claim 1 wherein said circuit means includes an electric socket energizable when said motor is energized for operating a tape recorder or the like.

6. The combination according to claim 1 wherein said means connecting said lever to said first cam means comprises a first push rod slidably received at said one side of said base and having a lower end engageable with said first cam means and an upper end engageable with said lever, and biasing means for holding said lever in engagement with said first push rod.

7. The combination according to claim 1 wherein said means connecting said second cam means to said telephone receiver cradle comprises a second push rod slidably supported at the opposite side of said base and having a lower end engageable with said second cam means and an upper end engageable with said cradle.

8. The combination according to claim 1 wherein said base includes locating means for removably receiving said telephone on said base in accurately aligned relationship with said connecting means.

References Cited

UNITED STATES PATENTS 3,345,463 10/1967 Hynes ---------------- 179—5

3,352,972 11/1967 Brown --------------- 179—5

RALPH D. BLAKESLEE, Primary Examiner

U.S. Cl. X.R.

179—90